UNITED STATES PATENT OFFICE.

JOHN HABERMEHL, OF ALLEGHENY, PENNSYLVANIA.

IMPROVEMENT IN PATTERNS FOR METALLIC CASTING COMPOSITION.

Specification forming part of Letters Patent No. 189,729, dated April 17, 1877; application filed April 2, 1877.

*To all whom it may concern:*

Be it known that I, JOHN HABERMEHL, of the city of Allegheny and State of Pennsylvania, have invented a new article of Manufacture for Stove-Patterns, of which the following is a true specification:

The principle of my invention consists in the preparation of any hard fatty substance embraced within the terms of beeswax, stearine, and paraffine, so that the same can be successfully and advantageously used in making patterns for metallic castings commonly called "stove-patterns."

The said fats, as well known, when in a congealed state, have considerable strength and hardness, but are nevertheless too frail and weak to admit of being carved into patterns, and, moreover, are either too smeary, sticky, or brittle to be worked with edge-tools.

The good properties of said fats are, that when in a molten state they will set very rapidly when removed from heat, and, when congealed, will forever remain in the same position without warping out of shape, which property is so desirable for patterns, and the warping such a great annoyance when made of wood; and, furthermore, wooden patterns are very expensive, owing to the great skill required to make them.

Now, to give a better substitute for wood, I overcome the bad principle of said fats and control the good, and I do this in two principal ways.

First, to give the said fats strength, I incorporate or combine them with any fibrous material, such as leather, cloth, felt, paper, &c., by saturating them with either of said fats in a hot molten state, and pressing the goods in any suitable arrangement while hot, to obtain an even surface when the fat is congealed.

Hence, any fibrous material thus prepared will be strong and amply stiff enough to mold in the sand, can be sawed, cut with edge-tools, pressed into any form while warm, and will retain its shape when cold, to surpass wood in light labor, and cheapness in constructing small patterns for metallic castings.

My pattern goods may be made to any desired thickness by pressing together the requisite number of layers of any fibrous material while the fat is hot, and left to congeal to form a cement between the joints.

No rule can be given to suit all cases, no more than with wood, how my goods must be placed upon the "follow-board" in making a pattern, owing to the manifold different styles of patterns, each requiring its own peculiar skill and mechanical judgment. For straight lines I use stiff paper, for simple curves felt-paper, and for extremely difficult curves, leather or cloth.

In all cases I cut the goods in sectional parts to suit the simple or difficult shape or curve of the pattern, warming the goods to become sufficiently pliable; then press the same on the follow-board, and hold them down with the fingers, or tack them fast until the fat will congeal.

After the pattern goods have become stiff to retain their form, the next point is to unite the joints, and to smooth the surface.

With a plain pattern, having an even surface, the same may be jointed in a number of simple ways. The edges may be made to meet flush and sewed, (using a shoemaker's awl;) or the joints may be cut in a slant to overlap and pegged fast with shoemakers' pegs, or a hot iron run over the overlap to melt the fat between the layers, and pressing the parts together till the fat hardens.

The most simple, which will answer in most cases, is to leave a gap about the sixteenth of an inch between the joints, and fill it with boiling-hot refined paraffine, first laying a slip of oiled paper underneath the joint to guard against cementing the pattern fast to the follow-board.

Thus a plain pattern may be made from the pattern goods as they come from the press, without any special preparation of said fats. By brushing the surface over with boiling-hot paraffine, or, next best, stearine, the same may be made as smooth as glass.

But when a pattern is full of configurations, to require skillful carving, the said fats will not answer to unite joints and smooth the surface. Beeswax is too sticky, paraffine does not cut with sufficient ease, while stearine cuts best but is too brittle. Now this brings me to my second point. I overcome this by incorporating the said fats with any vegetable or mineral pulverulent substance which will absorb the smeary stickiness and give an unyielding body to the compound, so that the same can be scraped and cut.

The mixture only being mechanical, it stands to reason that powdered sand, pumice-stone, emery, and the like, will make a very hard cement, while soap-stone, fire-clay, chalk, lime, are more yielding and have not the same strength.

In the mineral line, white lead, yellow ocher, or, in fact, any good bases for a point, will make a good cement.

To the above list may be added flour, starch, corn meal, &c. I find, however, that charcoal or coke, powdered to fine dust, with a small percentage of plumbago, surpasses them all for having the greatest absorbing power, and yet giving a very rigid support to the fat as a strong cement.

White lead, red lead, yellow ocher are in some respects preferable, for not being so dulling to edged tools.

The degree of hardness of the compound is simply a question as to the percentage of the powder added, and this must be regulated for the different purposes for which it is intended.

For cementing delicate joints, or for smoothing the surface of the pattern, just enough powder must be intermixed with the hot fat so that it will flow with a brush; but where large gaps or indentations require filling up, or where the cement is intended for elevations on "follow-boards," sufficient powder must be added to make the mass, when hot, stiff enough to be laid on with a paddle.

After the pattern is properly shaped and the joints cemented in manner explained, the ordinary methods of smoothing surfaces will not answer.

Any number of successive coatings of the above-named charcoal cement may be laid on with a fine brush, and successively scraped off until the requisite smoothness is obtained.

A pattern may be rubbed down in the rough with wire-gauze or punched tin; next, a suitable scraper must be used, (tinners' scraps are well suited, as they can be sharpened readily with a file and bend to suit all curves;) and, finally, the pattern may be finished by rubbing it down with a cloth, fine charcoal, and soap-suds.

Gum-shellac varnish may or may not be used.

One of the most important features of my manufacture is, no matter how often a pattern may be spoiled, so to speak, it can be readily amended by adding fresh material, impossible with wood. Not only that, as the patterns are only used once, the goods may be used over and over again by cutting and reheating them to suit other forms, and finally all the scraps and offal can be used to a good advantage to make elevations and forms for temporary uses on follow-boards.

For follow-boards, the cheapest materials may be used for filling up in the rough. Old rags, carpets, paper-mash, sawdust, will suit, and finally using the above smoothing cement described.

Crude paraffine will answer, and either of said fats may be mixed with about one-third of rosin and a small percentage of tallow, to temper down the brittleness of the mixture.

What I claim as a new article of manufacture, as pattern goods for metallic castings, is—

1. Beeswax, stearine, or paraffine, incorporated with leather, cloth, paper, or any fibrous material, to be used in the construction of patterns for metallic castings, in manner explained and set forth.

2. A compound as a smoothing cement in finishing patterns for metallic castings, having for its bases beeswax, stearine, or paraffine, in combination with any carbonaceous or calcareous pulverulent substance, substantially as and for the purposes specified.

JOHN HABERMEHL.

Witnesses:
ANTON GLAMSER,
JOHN WEHNER.